United States Patent
Venkatasubramanya et al.

(10) Patent No.: US 12,504,936 B2
(45) Date of Patent: Dec. 23, 2025

(54) WINDSHIELD HAVING ZONAL DISPLAYS

(71) Applicant: Harman International Industries, Incorporated, Stamford, CT (US)

(72) Inventors: Yeshvanth Narahari Venkatasubramanya, South Lyon, MI (US); Rhita Boufelliga, West Bloomfield, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 18/400,453

(22) Filed: Dec. 29, 2023

(65) Prior Publication Data
US 2025/0217090 A1  Jul. 3, 2025

(51) Int. Cl.
*G06F 3/14* (2006.01)
*B60K 35/233* (2024.01)
*B60K 35/81* (2024.01)
*B60K 35/90* (2024.01)
*G02B 27/01* (2006.01)
(Continued)

(52) U.S. Cl.
CPC .......... *G06F 3/1423* (2013.01); *B60K 35/233* (2024.01); *B60K 35/81* (2024.01); *B60K 35/90* (2024.01); *G02B 27/0101* (2013.01); *G06F 3/011* (2013.01); *G06F 3/017* (2013.01); *B60K 2360/1464* (2024.01); *G02B 2027/0118* (2013.01); *G06F 3/04842* (2013.01)

(58) Field of Classification Search
CPC ........................... G06F 3/1234; B60K 35/233
See application file for complete search history.

(56) References Cited

U.S. PATENT DOCUMENTS

2010/0157430 A1\* 6/2010 Hotta ...................... G02B 27/01
359/630
2014/0260855 A1\* 9/2014 Tokura ................... B26D 5/007
83/76.1
(Continued)

FOREIGN PATENT DOCUMENTS

| DE | 102013016250 | 4/2015 |
|---|---|---|
| WO | 2022244873 | 11/2022 |
| WO | 2023232605 | 12/2023 |

OTHER PUBLICATIONS

Sung, et al., On-device Real-time Hand Gesture Recognition, Oct. 29, 2021, doi arXiv:2111.00038v1.
(Continued)

*Primary Examiner* — William Boddie
*Assistant Examiner* — Bipin Gyawali
(74) *Attorney, Agent, or Firm* — Burris Law, PLLC

(57) ABSTRACT

A system may include one or more display. A system may include a pane of the vehicle comprising one or more region in which: a barrier is formed by the pane and the barrier separates an interior of the vehicle from an exterior of the vehicle, the barrier is one or more of transparent or translucent with respect to all transmissions of visible light through the one or more region from the exterior of the vehicle to the interior of the vehicle, an outer periphery of the pane forms an edge and bounds a surface area of the pane, and the one or more region extends over more than 20% of the surface area. A system may cause a visual output to adjust the transmissions of visible light through the one or more region, in which the visual output is based on the one or more display.

18 Claims, 8 Drawing Sheets

(51) Int. Cl.
    *G06F 3/01*          (2006.01)
    *G06F 3/04842*    (2022.01)

(56) References Cited

U.S. PATENT DOCUMENTS

| | | | |
|---|---|---|---|
| 2018/0088323 A1* | 3/2018 | Bao | G02B 27/017 |
| 2020/0002219 A1* | 1/2020 | Park | C03C 3/155 |
| 2020/0114974 A1* | 4/2020 | Marukawa | B62D 25/06 |
| 2020/0385116 A1* | 12/2020 | Sabripour | B64U 10/60 |
| 2021/0054690 A1 | 2/2021 | Ramirez | |
| 2022/0281317 A1* | 9/2022 | Ahn | G06T 5/80 |
| 2022/0283432 A1 | 9/2022 | Richards | |
| 2023/0017486 A1 | 1/2023 | Homma et al. | |
| 2023/0069899 A1* | 3/2023 | Corboliou | H04N 9/3194 |
| 2023/0120933 A1* | 4/2023 | Kim | B60W 50/14 |
| | | | 345/633 |
| 2023/0244316 A1* | 8/2023 | Schwarz | G06F 3/017 |
| | | | 345/156 |
| 2023/0280827 A1* | 9/2023 | Crispin | G06F 3/011 |
| | | | 345/156 |
| 2025/0222857 A1* | 7/2025 | Rodriguez Barros | B60Q 1/525 |

OTHER PUBLICATIONS

Zhang, et al., MediaPipe Hands: On-device Real-time Hand Tracking, Jun. 18, 2020, doi arXiv:2006.10214v1.
Extended European Search Report issued in corresponding EP Application 24220516.9, issued Jun. 10, 2025, 10 pages.

* cited by examiner

WINDSHIELD HAVING ZONAL DISPLAYS

FIELD

The present disclosure relates to a windshield having zonal displays and a vehicle including a windshield having zonal displays.

BACKGROUND

The statements in this section merely provide background information related to the present disclosure and may not constitute prior art.

During travel, occupants of vehicles often desire to view or adjust their appearance. As the look and feel of modern vehicles progresses, the surface area of transparent or semi-transparent structural components may be increased to improve occupant experience, removing structural components previously used to address occupant vanity.

SUMMARY

This section provides a general summary of the disclosure and is not a comprehensive disclosure of its full scope or all of its features.

For example, a vehicle may remove support structures (e.g., body panels, cross bars, pillars) in order to provide a more transparent passenger compartment. For example, the windshield and roof may be formed through a single pane or without opaque support structures, which can remove the support structures necessary for visors, vanity mirrors, and other vehicle components. Cantilever supports or other mechanisms may provide access to visors, vanity mirrors, and other vehicle components and further detract from occupant experience, obstructing views through the pane (e.g., windshield, windows). A display may be used to provide occupants with an indication of their current appearance or provide other information or entertainment content without obstructing views with opaque components.

In one or more form, the techniques described herein relate to a vehicle including: one or more display; a pane of the vehicle including one or more region, wherein: a barrier is formed by the pane and the barrier separates an interior of the vehicle from an exterior of the vehicle, the barrier is one or more of transparent or translucent with respect to all transmissions of visible light through the one or more region from the exterior of the vehicle to the interior of the vehicle, an outer periphery of the pane forms an edge and bounds a surface area of the pane, and the one or more region extends over more than 15% of the surface area; one or more processors; and non-transitory memory including instructions operable upon execution by the one or more processors to: cause a visual output to adjust the transmissions of visible light through the one or more region, wherein the visual output is based on the one or more display.

In one or more form, the techniques described herein relate to a vehicle, wherein the one or more display includes a first display and a second display, the first display is configured to provide a first portion of the visual output based on a projector, and the second display is configured to provide a second portion of the visual output based on an organic light emitting diode integrated with the pane. The one or more region includes a first region and a second region, and the first display is configured to provide the first portion of the visual output within the first region, and the second display is configured to provide the second portion of the visual output within the second region. The first region forms a border with the second region and the first portion of the visual output on the border is less luminant than a maximum luminance of the first portion of the visual output. The first region forms a border with the second region and the first portion of the visual output on the border is less luminant than a maximum luminance of the second portion of the visual output. The first display includes a wedge film and the wedge film is configured to reduce an appearance of reflections associated with the first display or the second display. The vehicle may include a support structure of the vehicle. The support structure forms an inner periphery, and the pane is sized to extend to the inner periphery and the inner periphery joins the outer periphery of the pane. The visual output is based on a digital representation and the digital representation depicts surroundings of the exterior of the vehicle. The surroundings of the exterior of the vehicle include a rear view and the rear view is based on a perspective from a location on the vehicle. The vehicle includes a projector of the one or more display is arranged on a roof of the vehicle. The location is a side of the vehicle. The visual output increases an opacity of the barrier. The one or more region extends over less than 50% of the surface area during a first state of operation and the one or more region extends over more than 50% of the surface area during a second state of operation. The one or more display includes a first display based on a frit, a second display based on a projector, and a third display based on an organic light-emitting diode. One or more sensor is configured to output one or more digital representation, and the one or more display includes a first display and a second display, the first display is configured to provide a first portion of the visual output, and the second display is configured to provide a second portion of the visual output. The one or more region includes a first region and a second region, and the first display is configured to provide the first portion of the visual output within the first region, and the second display is configured to provide the second portion of the visual output within the second region. The visual output includes a first user interface element within the first portion of the visual output and a second user interface element within the second portion of the visual output. The non-transitory memory further includes a neural network and instructions operable upon execution by the one or more processors to recognize one or more gesture. The execution causes recognition of the one or more gesture is based on the one or more digital representation and the neural network. The execution causes determination of an operation. The determination of the operation is based on the one or more gesture and the neural network. The execution cause the determination of a selection. The determination of the selection being indicative of the first user interface element or the second user interface element. The determination of the selection is based on the one or more gesture, and the one or more neural network, and execute the operation. The execution of the operation is based on the one or more processors and the selection. The one or more sensor includes a first sensor positioned on a roof of the vehicle and a second sensor positioned on a dashboard of the vehicle, the one or more digital representation includes a first digital representation based on the first sensor and a second digital representation based on the second sensor, and a first input of the neural network is based on the first digital representation and a second input of the neural network is based on the second digital representation.

In one or more form, the techniques described herein relate to a method for operating a vehicle, the method includes causing a visual output to adjust transmissions of visible light through a first region and a second region. The visual output includes a first user interface element and a second user interface element. The first user interface element depicted within the first region and the second user interface element depicted within the second region. The method includes recognizing one or more gesture. The recognition of the one or more gesture is based on one or more digital representation. The one or more gesture is indicative of an operation and a selection, and the selection is indicative of the first user interface element or the second user interface element. The method includes executing the operation, wherein the execution of the operation is based on the selection. The operation includes an adjustment to an experience provided to an occupant of the vehicle.

In one or more form, the techniques described herein relate to a method for training a neural network, the method includes curating training data, wherein the training data includes depictions of gestures and annotations of the gestures and the gestures are based on depictions of a position of a first body part and depictions of a movement of a second body part. The method includes training the neural network based on a first subset of the training data. The neural network is configured to recognize an operation and a selection of a first user interface element or a selection of a second user interface element. The method includes validating the neural network based on a second subset of the training data.

In one or more form, the techniques described herein relate to a method, wherein the first body part includes one or more of an eye, a head, or a neck, and the second body part includes a hand.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

In order that the disclosure may be well understood, there will now be described various forms thereof, given by way of example, reference being made to the accompanying drawings, in which.

Figure 1:
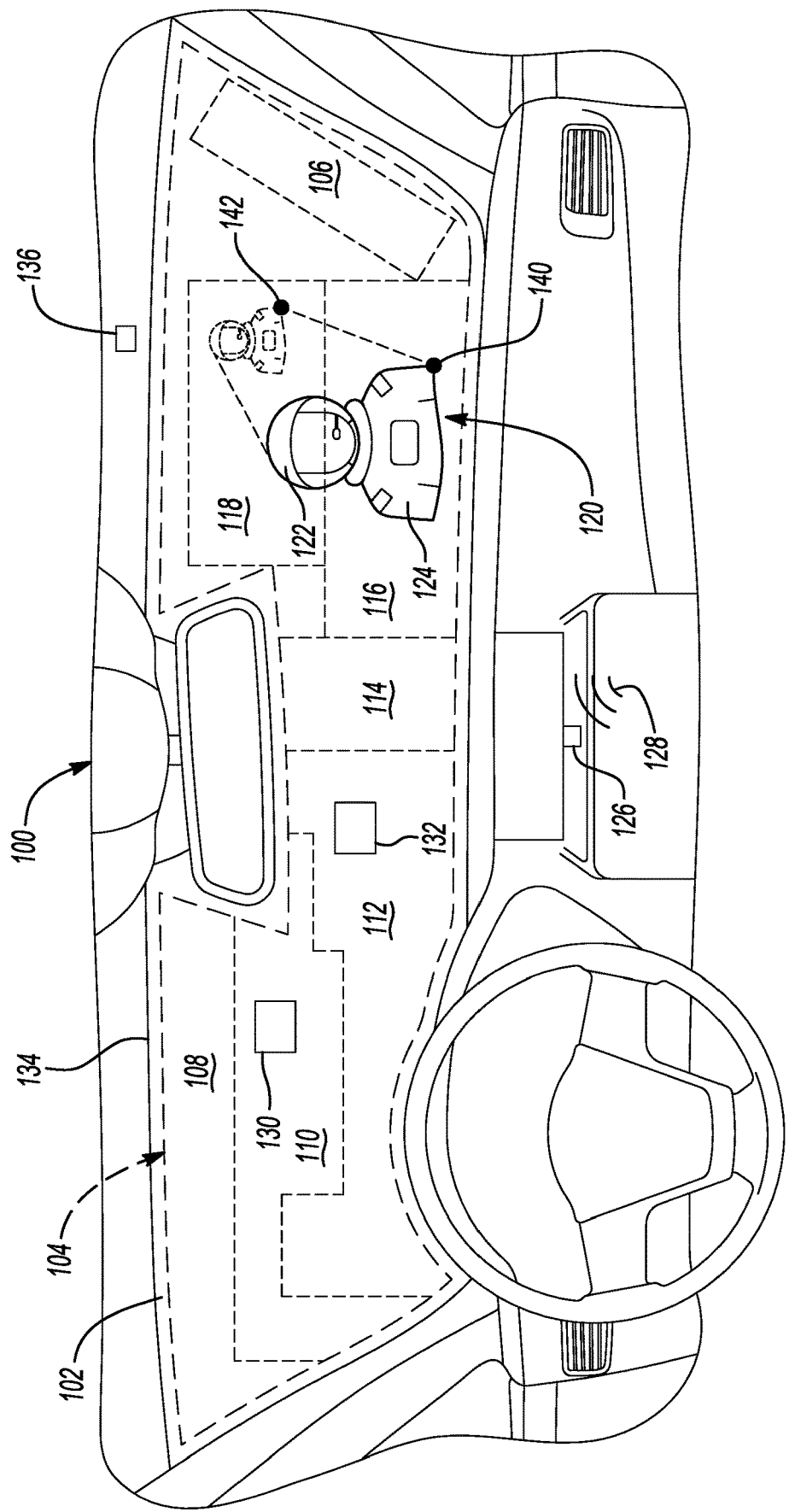
FIG. 1 illustrates a system in accordance with one or more implementation of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In one or more forms, the present disclosure includes a method for depicting a visual representation on one or more pane of a vehicle. The one or more pane includes a first location. The method includes determining the visual representation based on an occupant. The method also includes depicting the visual representation at the first location. The determination of the visual representation may include capturing radiation reflected from the occupant. The determination of the visual representation may include applying a transform to a digital representation based on the radiation. The transform may adjust a perspective distortion of the digital representation. The radiation may be within a visible light spectrum or the radiation is within an infrared spectrum.

Referring to FIG. 1, a system 100 is shown in accordance with one or more implementation of the present disclosure. The system 100 includes one or more panes 102. The pane 102 may be a windshield, side window, rear window, or another transparent or semitransparent component that allows occupants to see an environment outside of a vehicle. The pane 102 may form a barrier between the interior of the vehicle and the exterior of the vehicle, and the pane 102 may allow the transmission of light that is visible to a typical human eye. The visible light may be augmented by a display (e.g., display 104). The pane 102 may comprise an edge 134 that forms an outer periphery of the pane. The outer periphery of the pane 102 may join an inner periphery of a support structure (e.g., body panels, cross bars, pillars) of the vehicle. The pane 102 includes one or more layers of glass, plastic, or other components that constitute a display 104.

For example, the pane 102 may be configured to permit augmented reality for occupants across the entire pane 102. The pane 102 may include technologies for providing augmented reality in the form of a heads-up display. A heads-up display may provide information, indications, representations, graphics, and other depictions without requiring a gaze associated with the occupants to leave the pane 102. Some example technologies for providing the display 104 are described herein, and those described herein are a non-exhaustive list of technologies that are contemplated for providing augmented reality to occupants through a heads-up display. The display 104 may cause a visual output. The visual output may comprise one or more user interface element 130, 132 or a visual representation 120 discussed herein. The user interface element 130, 132 may be used to interface with the vehicle or other systems. For example, the user interface element 130, 132 may be depicted as a knob, switch, button, or another control used to perform an operation (e.g., start a movie, adjust volume, change air conditioning, lock doors). The visual output may comprise content (e.g., videos, images, graphics) or any other emission of light within the electromagnetic spectrum or that is perceivable to the human eye.

The display 104 includes at least one region (e.g., regions 106, 108, 110, 112, 114, 116, 118) for depicting information (e.g., one or more portions 122, 124 of a visual representation 120) on the pane 102 such that light through the pane 102 is transmitted to an eye of the occupant. The transmission of light may be augmented, providing an augmented reality for the occupant. The visual representation may be based on an occupant of a vehicle, a participant to a conference call, or a combination thereof. The regions 106, 108, 110, 112, 114, 116, 118 may be defined by locations that are associated with a particular display technology. For example, regions near the dashboard (e.g., regions 112, 114, 116) may be provided by a heads-up display based on a projector or otherwise and regions (e.g., regions 108, 110, 118) near the top of the pane 102 or on a roof portion of the pane 102 may be provided by a technology based on an organic light emitting diode (OLED) array, liquid crystal display, transparent display, microLED, neoQLED, or otherwise. The output from heads-up display technology may be integrated together such that the display 104 fills the entire pane or portions thereof. Regions 106, 108, 110, 112, 114, 116, 118 are shown as various shapes and sizes and integrated together in a patchwork such that the display provides a desired area of coverage. The regions may have adjacent borders such that the depiction of a visional representation (e.g., visual representation 120) is seamless or that the occupant cannot perceive that the depiction is provided by different display technologies. Region 106 is situated to provide blind spot monitoring and may be similarly situated on either the driver or passenger sides of the vehicle.

Figure 3:
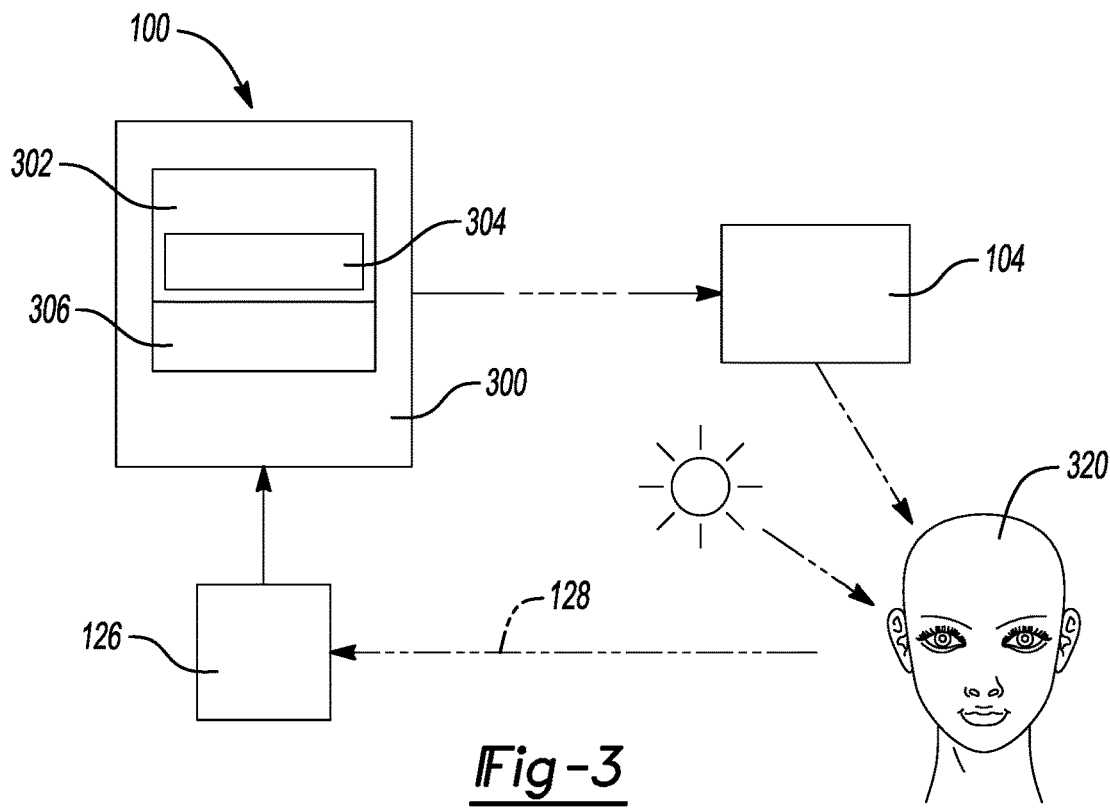
FIG. 3 illustrates a schematic diagram of the system in accordance with one or more implementation of the present disclosure.

The system 100 includes a sensor 126 (e.g., a visual light camera, infrared detector) for generating the visual representation 120. For example, the sensor 126 may capture visible light (e.g., electromagnetic radiation 128) generated by the display 104 and reflected from an occupant. The sensor 126 may convert the electromagnetic radiation 128 from energy to digital values, which may be indicative of a representation of the occupant (e.g., visual representation 120). The visual representation 120 is shown depicted at a first location 140. The first location 140 may have a vertical height greater than the second location 142 with respect to the occupant 320 (occupant 320 is shown in FIG. 3). The visual representation 120 may be moved from one location to another based on an input, eye gaze, gesture, other information, or combination thereof.

Figure 2A:
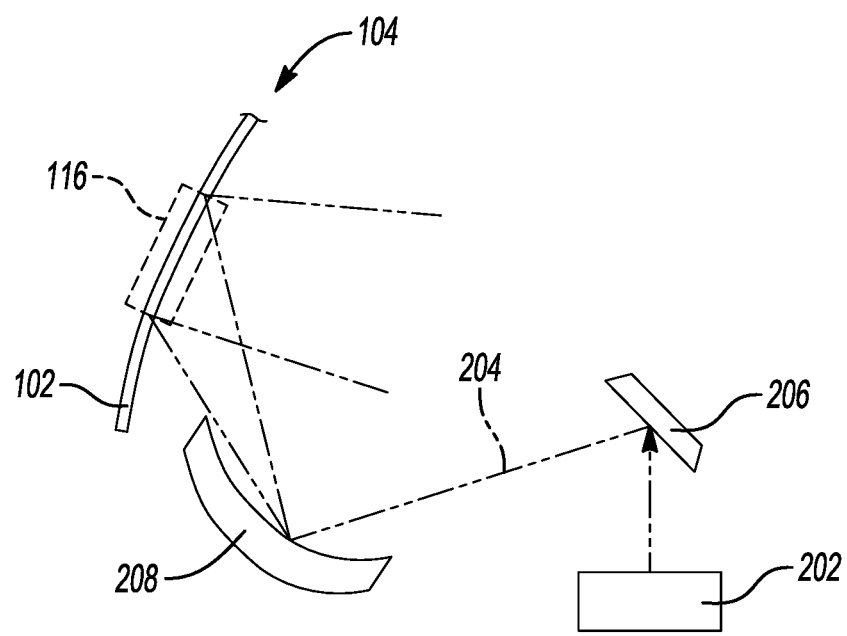
FIG. 2A illustrates one or more portions of a display in accordance with one or more implementation of the present disclosure.

Referring to FIG. 2A, one or more portions of the display 104 is shown in accordance with one or more implementation of the present disclosure. As described herein, the display 104 may comprise one or more technologies for providing an augmented reality for occupants. For example, the display 104 may be generated based on a projector 202. For example, the display 104 may be based on a technology that reflects light 204 emitted from the projector 202. The projector 202 may be configured to emit light 204 toward one or more mirrors 206, 208 to depict a representation (e.g., visual representation 120), or portion thereof, on one or more region (e.g., region 112, 114, 116). The light 204 emitted by the projector 202 may be reflected off of the pane 102 to generate the display 104 viewable from an occupant of the vehicle from a passenger seat.

Figure 2B:
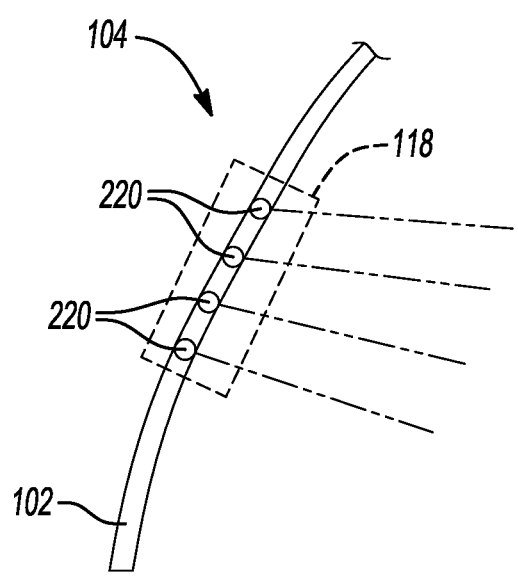
FIG. 2B illustrates one or more portions of a display in accordance with one or more implementation of the present disclosure.

Referring to FIG. 2B, one or more portions of the display 104 is shown in accordance with one or more implementation of the present disclosure. As described herein, the display 104 may comprise one or more technologies for providing an augmented reality for occupants. For example, the display 104 may be generated based on one or more light emitting diodes 220, liquid crystals, plasma pixels, or another technology. For example, the display 104 may be based on a technology that is embedded into the pane 102 for viewing by the occupant of the vehicle from a passenger seat. As shown, the light emitting diodes 220 are distributed throughout the pane 102 to provide the display 104 over the region (e.g., region 118).

Adjacent technologies may be subject to overlap or blurring caused by bleeding or reflections from adjacent technologies. Wedge film may be used to reduce the overlap or blurring between edges of adjacent regions. Further, dimming of boundary areas (e.g., reducing luminance) where regions adjoin may be used to reduce overlap, blurring, bleeding, unintended reflections, or other imperfections caused by adjacent technologies.

Referring to FIG. 3, a schematic diagram of the system 100 is shown in accordance with one or more implementation of the present disclosure. The system 100 includes sensor 126. The sensor 126 may be configured to capture electromagnetic radiation 128. Sensor 126 provides an indication of electromagnetic radiation 128 reflected from an occupant 320 to a controller 300. The electromagnetic radiation may originate from the ambient light or the display 104. The sensor 126 may be located on a dashboard or console of the vehicle. A sensor 136 may be located on a roof, cross-beam, or pillar of the vehicle.

The sensor 126 may convert the electromagnetic radiation 128 into a digital form and communicate with the controller 300 over a communications bus. The communications bus may be a controller-area network (CAN). The controller 300 may include one or more processor 306, non-transitory memory 302 and instructions 304 disposed thereon. The instructions 304 may be configured to, upon execution by the one or more processors 306, to perform one or more of the steps described herein (e.g., determining, depicting, transforming). For example, the instructions 304 may cause the one or more processors 306 to output a visual representation 120 from the projector 202 or light emitting diodes 220 for depiction on the display 104.

Figure 4:
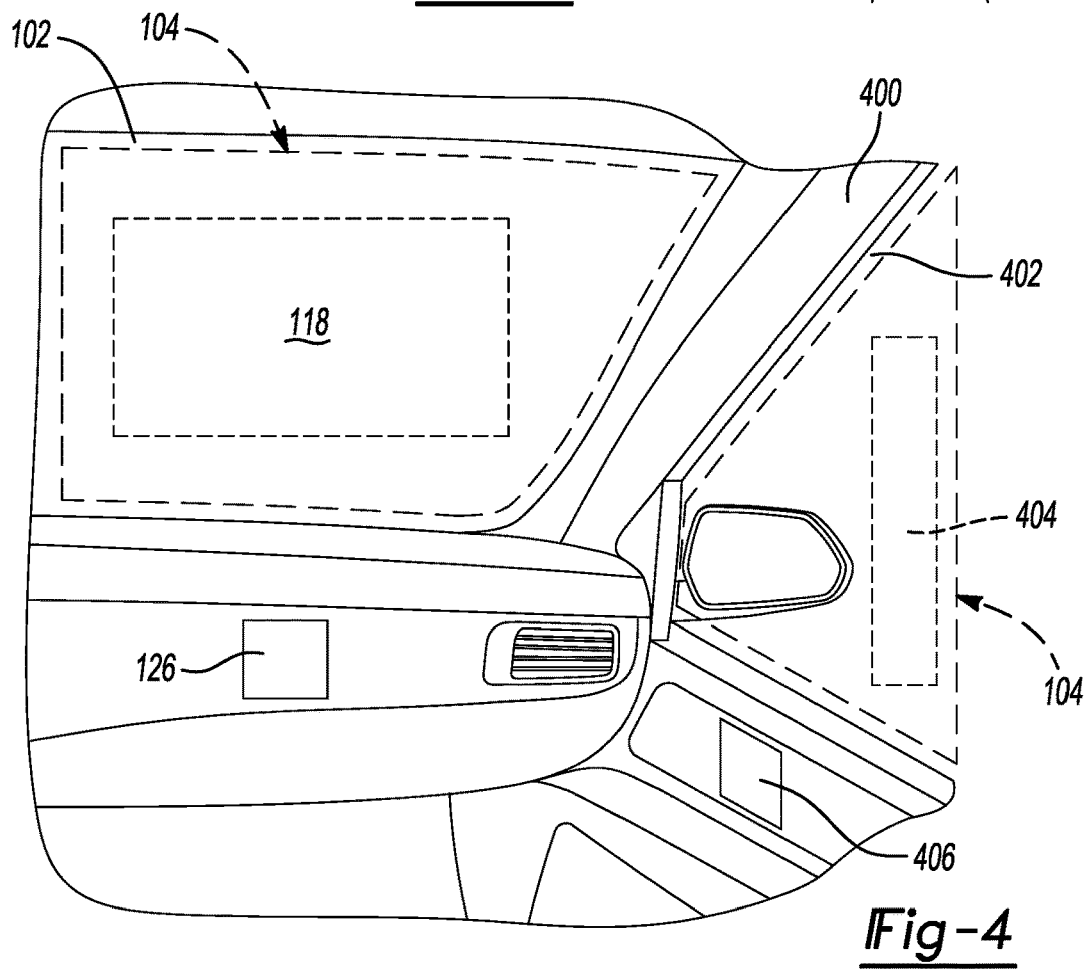
FIG. 4 illustrates a multi-pane display in accordance with one or more implementation of the present disclosure.

Referring to FIG. 4, a display 104 across multiple panes 102, 402 is shown in accordance with one or more implementation of the present disclosure. Similar to the description with regard to FIG. 1, the display 104 may occupy multiple panes of a vehicle 400. For example, the display 104 may include multiple regions (e.g., regions 118, 404) distributed over a first pane 102 and a second pane 402. The second pane 402 may operate similar to the first pane 102. The visual representation 120 may be depicted across one or more of regions 118, 404. Region 404 may operate similar to region 118. The visual representation 120 may be based on one or more sensors 126, 406. Sensor 406 may operate similar to the sensor 126 from a different aspect. The visual representation 120 may be moved to a different location within the display 104 (e.g., between regions 118, 404) based on a gaze of the occupant 320 as discussed herein.

Figure 5A:
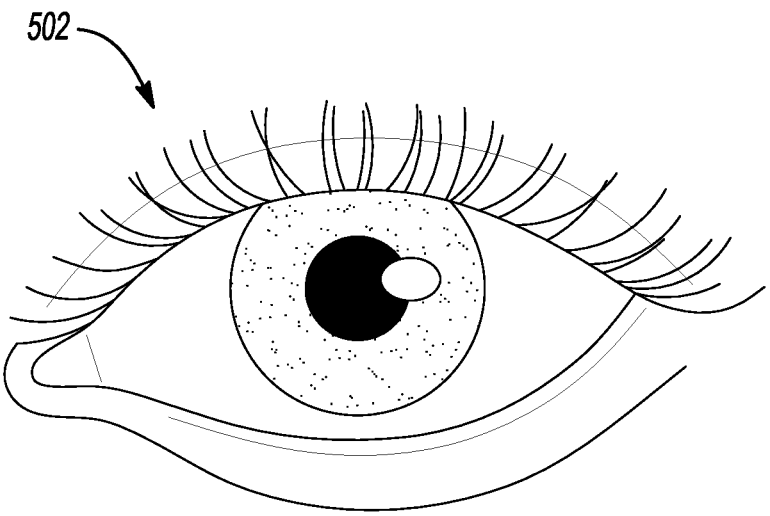
FIG. 5A illustrates a gaze in accordance with one or more implementation of the present disclosure.
Figure 5B:
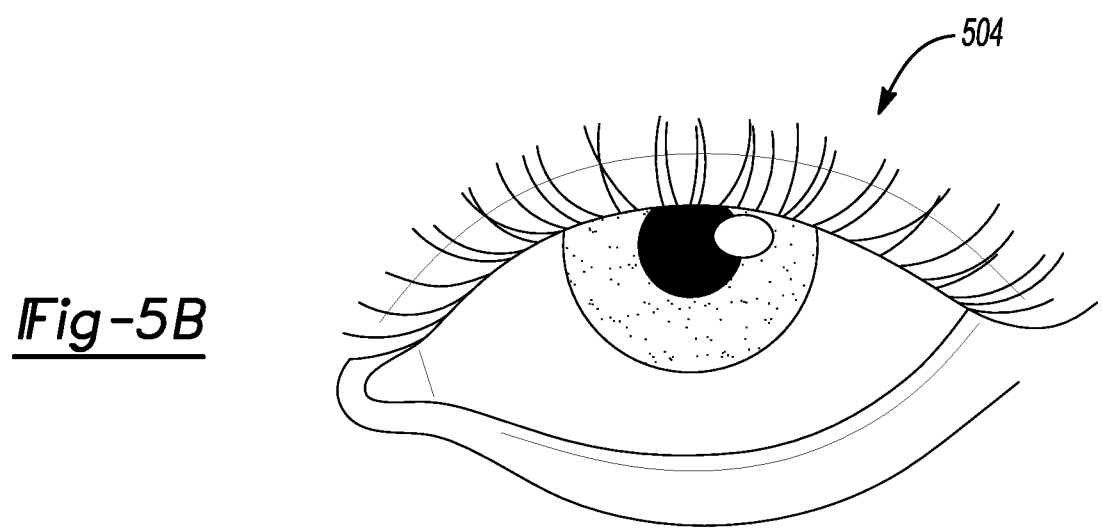
FIG. 5B illustrates another gaze in accordance with one or more implementation of the present disclosure.
Figure 5C:
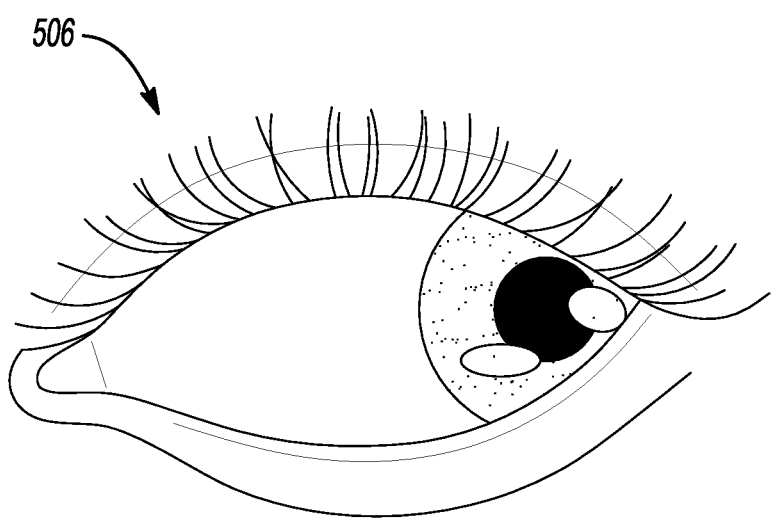
FIG. 5C illustrates yet another gaze in accordance with one or more implementation of the present disclosure.

Referring to FIGS. 5A-C, gazes 502, 504, 506 are shown in accordance with one or more implementation of the present disclosure. The gazes 502, 504, 506 may be determined with respect to the eyelid, head position, neck position, or another body position. For example, the position of the pupil of the eye may be indicative of a field of view of the occupant 320. Based on the field of view or the gaze (e.g., gaze 502, 504, 506), the controller 300 may be configured to adjust the location of the visual representation 120. For example, the controller 300 may adjust the visual representation 120 from a first region to a second region. The controller 300 may adjust the visual representation 120 from a first location to a second location within a region (e.g., region 116). The location may be defined based on a coordinate system with locations of the display 104 mapped to the locations on the pane 102. For example, the location or position of the visual representation may be based on the gaze (e.g., gaze 502, 504, 506) of the occupant 320.

Figure 6A:
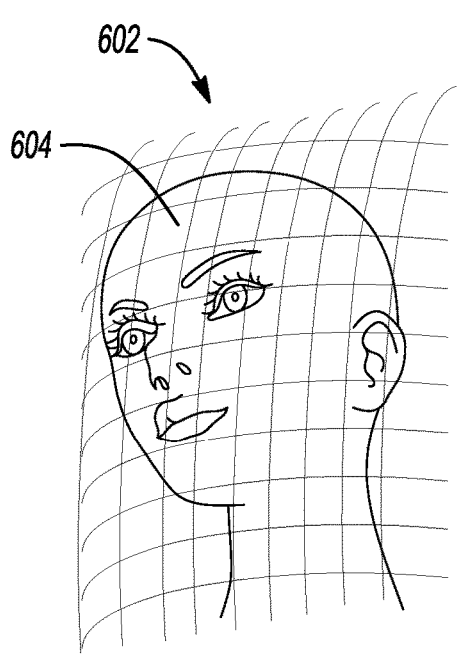
FIG. 6A illustrates a digital representation in accordance with one or more implementation of the present disclosure.
Figure 6B:
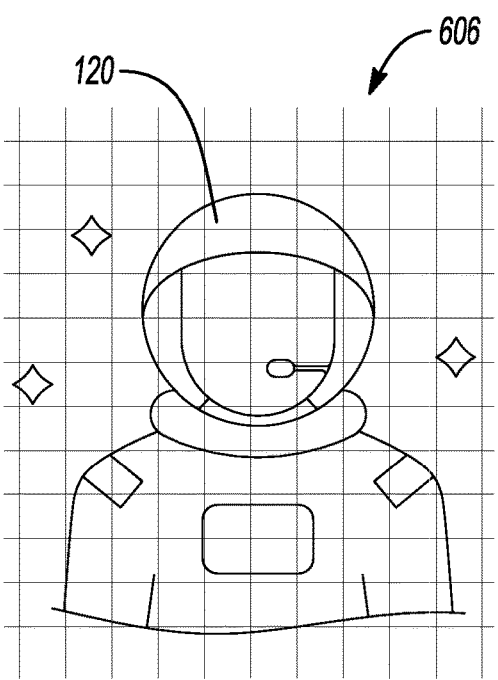
FIG. 6B illustrates a visual representation in accordance with one or more implementation of the present disclosure.

Referring to FIGS. 6A-6B, digital representation 604 and visual representation 120 are shown in accordance with one or more implementation of the present disclosure. The digital representation 604 may be an image (e.g., JPEG) based on data from a sensor (e.g., sensor 126, 406) determined according to radiation (e.g., radiation 128). The position of the sensor may skew the digital representation 604. For example, a sensor installed near the console (e.g., sensor 126) causes the digital representation to be from a perspective that distorts the occupant. A sensor installed on a door structure (e.g., sensor 406) may also cause the digital representation to distort the occupant. As such, a transform may be applied to change the perspective of the digital representation 604 and associated pixels 602 to a front facing visual representation 120 and pixels 606 for display one or more of panes 102, 402. The transform may be a pixel-wise mapping configured to warp the perspective of the digital representation based on the orientation and location of the sensor (e.g., sensor 126, 406). That is, the transform may be specific and based on the vehicle model, sensor position, occupant position, gaze, pane location, or other factors.

Figure 7:
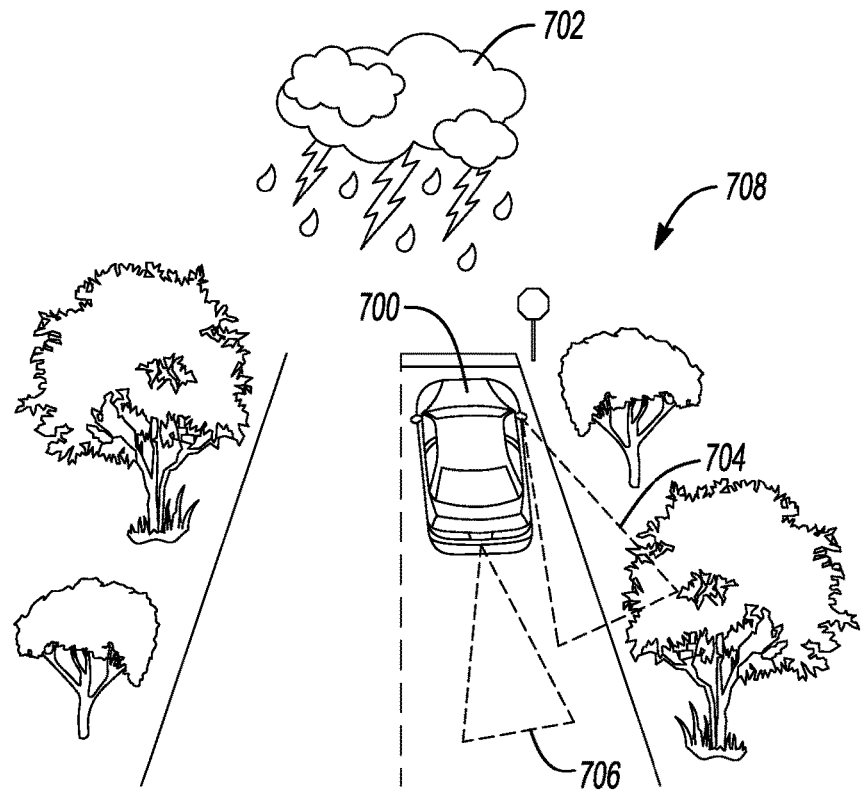
FIG. 7 illustrates a state of operation and a weather condition in accordance with one or more implementation of the present disclosure.

Referring to FIG. 7, a state of operation and a weather condition are shown in accordance with one or more implementation of the present disclosure. The visual representation 120 may be displayed based on a state of operation of vehicle 700. For example, during vehicle speeds greater than a threshold, the visual representation 120 may be adjusted to avoid interference with driving or other interactions. The state of operation of the vehicle 700 may be stored as data on one or more non-transitory memories. For example, the visual representation 120 may be removed from the display 104 when the vehicle speeds are greater than a threshold and displayed on the display 104 when the vehicle speeds are less than a threshold or stopped. Further, the size of the visual representation 120 may be based on the vehicle speed or the location of the visual representation 120 may be adjusted based on the speed, direction, or other states of operation of the vehicle. The state of operation may be based on a variety of vehicle parameters (e.g., speed, shifter position, road condition, weather condition). Weather conditions 702 surrounding the vehicle may further impact the visual representation 120. For example, luminosity of the visual representation 120, display 104, or other lighting apparatus (e.g., dome light) may be based on the weather condition 702. During inclement weather or night driving the luminosity may be reduced or adjusted. Further, the sensor (e.g., sensor 126, 406) may be configured to operate in an infrared mode to require less ambient light for generation of the digital representation 604 or the visual representation 120. The transform may further augment the digital representation 604 with a filter or another implement to alter the appearance of the occupant 320. For example, the filter may smooth wrinkles, blemishes, or other cosmetic issues associated with the occupant 320. As shown in FIG. 7, the vehicle 700 may have surroundings 708. The surroundings 708 may be depicted with the visual output. For example, a view 706 from the rear of the vehicle 700 may be shown with the display 104. A view 704 from the side of the vehicle 700 may be shown with the display 104.

Figure 8:
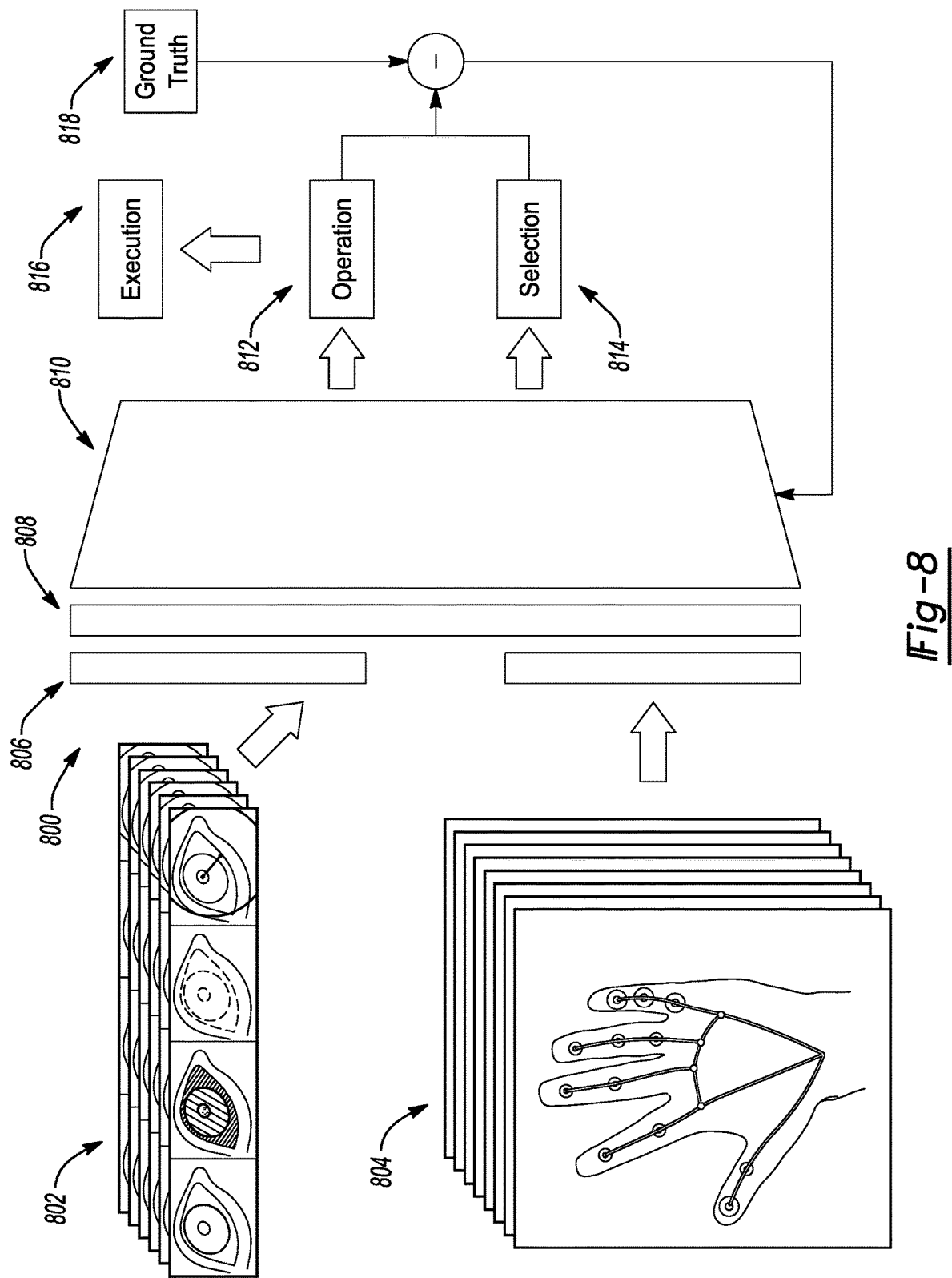
FIG. 8 illustrates a state of operation and a weather condition in accordance with one or more implementation of the present disclosure.

Referring to FIG. 8, a neural network 800 is shown in accordance with one or more implementations of the present disclosure. The neural network 800 may be trained by curated data 802, 804 and annotations (e.g., ground truths). For example, the annotations may indicate a gesture or eye gaze for a particular image or stream of images. The curated training data may include a first corpus of images that comprises depictions of a position of body parts that are indicative of the gaze of the occupant. For example, the first corpus of images may include images of eyes, heads, necks, or other body parts related to eye position. The first corpus of images may include annotated data indicative of the relevant gaze information (e.g., direction).

The curated data 802, 804 may include a second corpus of images that comprises depictions of the movement of a second body part. For example, the movement may be based on an eye, hand, or another body part indicative of a desired action. The neural network 800 may include an input layer 806 for receiving the images. The input layer may receive an image or stream of images from the curated training data 802, 804 during training or sensor 126, 136, 406 during use in a vehicle to recognize gestures, operations, or selections. The input layer 806 may be concatenated in layer 808 and fed, alone or with other data, to the feature recognition layers 810. The feature recognition layers 810 may be used to recognize features within the images or digital representations to recognize one or more gesture. The gesture may be indicative of an operation 812 (e.g., turning of a knob, pressing of an augmented reality button). The operation may turn up the volume, take a picture, start a call, or otherwise provide an interface for the occupant of the vehicle to interact with the vehicle based on the display 104. The gesture may be further indicative of a selection of one or more of the user interface elements across the display 104 or pane 102. For example, pane 102 may be augmented to provide a display 104 on the entire windshield, window, or otherwise and the combination of eye and hand gestures may be used to control the vehicle with user interface elements 130, 132. With user interface elements 130, 132 across the entire pane 102, the gaze may be used to determine the intended selection 814 between user interface element 130, 132 and the hand motion may be used to indicate the desired operation 812. The operation 812 and the selection 814 may be executed 816 by the one or more processors to obtain the desired effect. During training, an error between the annotations 818 of the ground truth and the recognized operation 812 and selection 814 may be used to further improve the recognition by the neural network 800 until an acceptable error is obtained.

Figure 9:
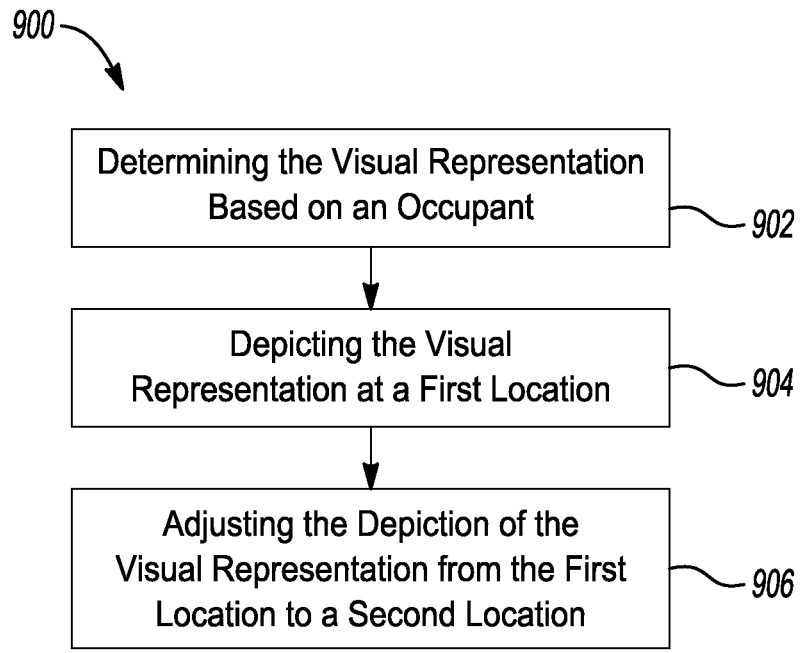
FIG. 9 illustrates a method for providing a visual representation in accordance with one or more implementation of the present disclosure.

Referring to FIG. 9, a method 900 is shown in accordance with one or more implementation of the present disclosure. The method 900 may provide an augmented reality experience for occupants of a vehicle 700. One or more of the steps of method 900 may be omitted, rearranged, or duplicated. In step 902, a visual representation 120 may be determined based on an occupant 320. The occupant 320 may be a passenger or a driver of the vehicle 700. The visual representation 120 may be determined based on the techniques described herein or other techniques. The visual representation 120 may be based on radiation reflected from the occupant 320. For example, the visual representation 120 may be based on electromagnetic radiation (e.g., radiation 128), visual light, infrared light, or other light reflected from the occupant 320. The electromagnetic radiation may originate from the sun (e.g., ambient light) or other light sources (e.g., dome lighting) or light emitted from the augmented reality display 104.

Step 902 may include additional steps for adjusting the appearance of the visual representation 120. For example, the sensor (e.g., sensor 126, 406) may capture electromagnetic radiation (e.g., radiation 128) indicative of the occupant 320. The sensor may convert the electromagnetic radiation to the digital representation 604. The digital representation 604 may be skewed from the sensor orientation relative to the occupant 320 and the display orientation. As such, the digital representation 604 and associated pixels 602 may be transformed from a first perspective to a second perspective to form pixels 606. The transform may warp the pixels 602 to the pixels 606 to form the visual representation 120 such that the pixels 606 of visual representation 120 are displayed to appear with a different perspective than the perspective the pixels 602 were captured from. In such a way, the sensor (e.g., sensor 126, 406) may be located to capture electromagnetic radiation from a different perspective than the emitted electromagnetic regulation from display 104.

In step 904, the visual representation 120 may be depicted. For example, the display 104 may be configured to present the visual representation 120 in one or more regions of the one or more panes 102. For example, the visual representation 120 may be depicted using more than one display technology. The depiction may be based on one or more inputs, and the depiction may include various parameters or settings. For example, the parameters may define how the visual representation 120 is depicted (e.g., location, size, luminance, filters) or when the visual representation 120 is depicted (e.g., based on a state of operation of the vehicle 700). The input may be used to determine the parameters.

The input may be a switch actuation (e.g., button press), received from another device, determined based on a state of the vehicle or surroundings of the vehicle, or otherwise. The input may be information available to the vehicle 700 for influencing operation of the depiction of the visual representation 120. The input may be a gesture of the occupant 320. The gesture may be determined by the controller 300 or sensor (e.g., sensor 126, 406). Artificial intelligence may be used to determine the gesture. For example, a convolutional neural network may be used to determine the presence of a particular gesture. The convolutional neural network may be trained on images or video of gestures. The gesture may be a physical movement of the occupant 320. For example, the gesture may be a facial expression. Facial expressions may include eye movements or a combination of hand or eye movements. For example, the occupant 320 may touch their face or look up as if looking into a mirror, which may trigger the depiction of the visual representation 120 and allow the occupant 320 to examine their face, eyes, hair, other features, or features associated with their person (e.g., clothing). The gaze (e.g., gazes 502, 504, 506) may be monitored to determine the gaze direction and determine whether the occupant 320 is looking forward or upward for use as an input.

The depiction may be adjusted from a first location to a second location in step 906. For example, the display 104 may define a coordinate system (e.g., cartesian) with respect to the one or more panes 102. The visual representation 120 may be adjusted from a first location to a second location. The locations may be associated with the regions 106, 108, 110, 112, 114, 116, 118 or defined as a subset of the regions. The locations may be defined by an origin (e.g., lower left-hand corner, upper right-hand corner) of the visual representation 120. An example first location 140 is shown along with an example second location 142 in FIG. 1. The visual representation 120 may be moved from the first location 140 to the second location 142 based on a gaze (e.g., gaze 502, 504, 506) of the occupant 320 to provide the visual representation 120 is depicted within a field of view of the occupant 320.

The radiation (e.g., radiation 128) received by the sensor (e.g., sensor 126, 406) may be generated based on the depiction of the visual representation. For example, the depiction may emit visible light that may reflect off of the occupant 320 and be further received or captured by the sensor (e.g., sensor 126, 406).

Figure 10:
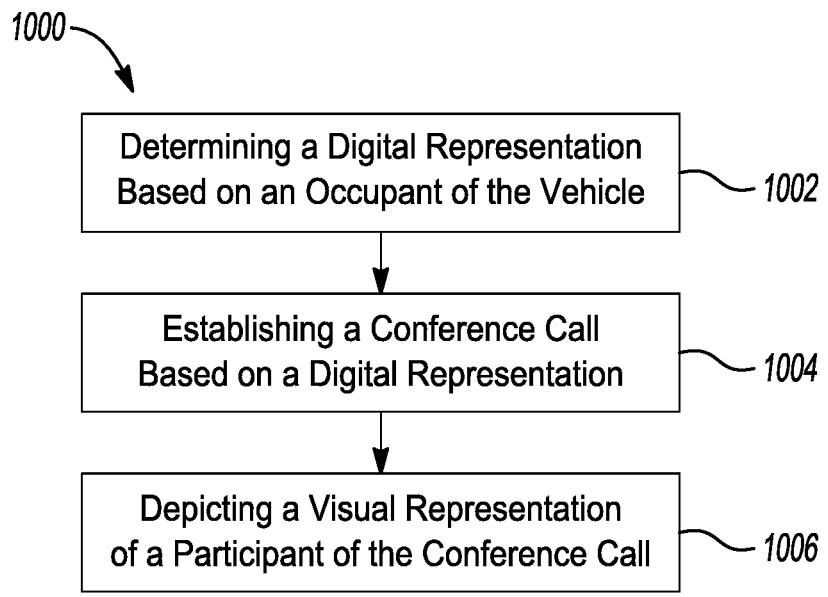
FIG. 10 illustrates a method for providing a visual representation in accordance with one or more implementation of the present disclosure.

In FIG. 10, a method 1000 is shown in accordance with one or more implementation of the present disclosure. One or more of the steps of method 1000 may be omitted, rearranged, or repeated. In step 1002, a digital representation (e.g., digital representation 604) may be determined. For example, a sensor (e.g., sensor 126, 406) may capture radiation (e.g., radiation 128) to define the digital representation 604. In step 1004, a conference call may be established. The conference call may use a voice-over-IP protocol or another protocol for establishing digital communications. The digital representation 604 may be sent to a participant of the conference call (e.g., the other end of the line). The participant may send their own digital representation and the digital representation of the participant may be depicted as the visual representation 120 on one or more of the panes 102 with the display 104. For example, the vehicle 700 may use display 104 to provide an augmented reality to occupant 320. The conference call may use filters or transforms described herein for depicting the participant or the occupant 320. For example, the filters may remove wrinkles, blemishes, or other cosmetic issues associated with the representation of the participant or the representation of the occupant. The visual representation 120 may be of the occupant 320 or participant and all of the techniques described herein are applicable to visual representations of the occupant 320 or visual representations of the participant. The display 104 may be further configured to depict visual representations of the occupant or the participant at the same time (e.g., side-by-side) in step 1006.

Figure 11:
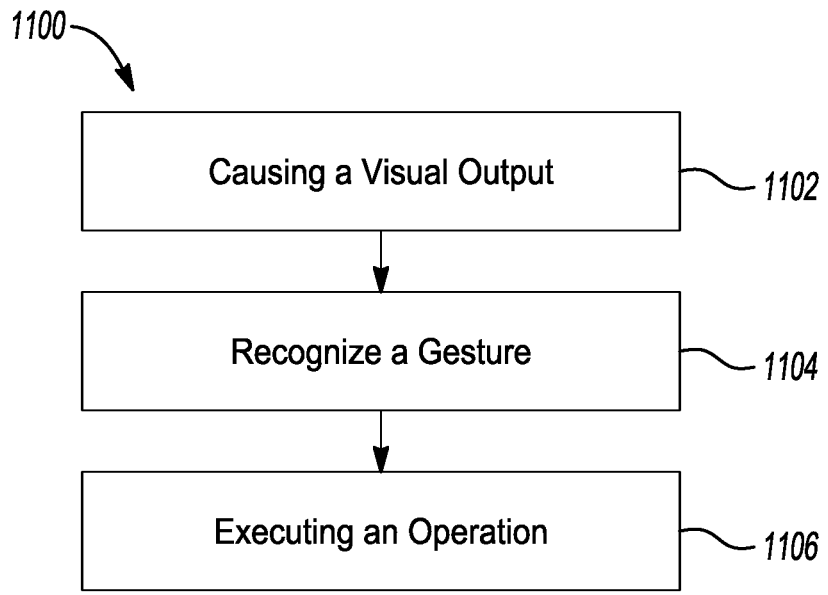
FIG. 11 illustrates a method for providing a visual representation in accordance with one or more implementation of the present disclosure.

In FIG. 11, a method 1100 is shown in accordance with one or more implementation of the present disclosure. The steps of method 1100 may be omitted, rearranged, duplicated, or combined with any other steps described herein. The method 1100 may be used for operating a vehicle. For example, the vehicle may provide a visual output that alters the transmission of visible light through pane 102. The visual output may include user interface elements 130, 132, video, other elements or graphics, or combinations thereof. The user interface elements 130, 132 may be depicted in different regions 110, 112.

In step 1102, the visual output may be caused. The visual output may be based on a display 104, pane 102, or combination thereof. In step 1104, a gesture may be recognized. For example, a neural network 800 may be used to recognize one or more gesture, and the gesture may be used to determine an operation 812 or a selection 814. The selection 814 may be indicative of one or more user interface elements 130, 132. For example, user interface element 130 may be a depiction of a knob and the gesture may be used to select the knob and perform the operation 812 associated with the knob (e.g., adjust volume). In step 1106, the operation 812 may be executed. For example, the volume may be adjusted based on the gesture. Any operation that impacts vehicle experience or operation is contemplated.

Figure 12:
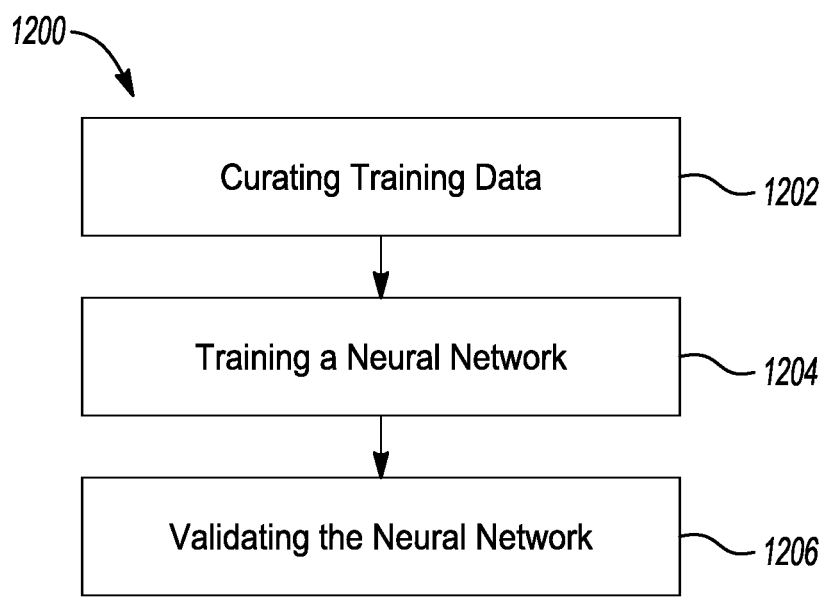
FIG. 12 illustrates a method for conducting a conference call in accordance with one or more implementation of the present disclosure.

In FIG. 12, a method 1200 is shown in accordance with one or more implementation of the present disclosure. The method 1200 may be used to train a neural network (e.g., neural network 800). The steps of method 1200 may be omitted, rearranged, duplicated, or used in any other method described herein. In step 1202, training data 802, 804 and annotations 818 of the ground truth is curated. For example, the training data 802, 804 may comprise depictions of gestures and annotations of the gestures. The gestures may include depictions of eyes, hands, heads, necks, and other body parts that may be used to recognize selections 814 and operations 812. An image or a stream of images may be used to determine selections 814 and operations 812. The curated training data 802, 804 may be separated into two subsets of data. The first subset may be used for training in step 1204. For example, the error between the annotations 818 of ground truth and the output of the neural network 800 during training may be used to update weights (e.g., back propagation) of the neural network 800 to improve accuracy and reduce loss. The weights may be updated (e.g., trained) until the neural network 800 is validated with the second subset to be above a predetermined loss in step 1206.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
one or more display;
a pane comprising a plurality of regions, wherein:
a barrier is formed by the pane and the barrier separates an interior of the vehicle from an exterior of the vehicle, the barrier is one or more of transparent or translucent with respect to all transmissions of visible light through the plurality of regions from the exterior of the vehicle to the interior of the vehicle,
an outer periphery of the pane forms an edge and bounds a surface area of the pane, and
the plurality of regions extend over the surface area and having one or more different shapes and one or more different sizes that are integrated together in a patchwork;
a rearview mirror coupled to the pane, wherein the plurality of regions having the one or more different shapes and the one or more different sizes comprises one or more regions sized and shaped to be complementary to and extend around and adjacent to a periphery of the rearview mirror;
one or more processors; and
non-transitory memory comprising instructions operable upon execution by the one or more processors to:
cause a visual output to adjust the transmissions of visible light through the plurality of regions, wherein the visual output is based on the one or more display.

2. The vehicle of claim 1, further comprising:
a support structure of the vehicle, wherein the support structure forms an inner periphery, the pane is sized to extend to the inner periphery and the inner periphery joins the outer periphery of the pane, and wherein the visual output increases an opacity of the barrier.

3. The vehicle of claim 1, wherein the patchwork defines a desired area of coverage for the one or more display, and wherein the plurality of regions have adjacent borders to form a seamless visual representation generated by a plurality of different display technologies.

4. The vehicle of claim 1, wherein the plurality of regions extend over less than 50% of the surface area during a first state of operation and the plurality of regions extend over more than 50% of the surface area during a second state of operation.

5. The vehicle of claim 1, wherein the one or more display comprises a first display based on a frit, a second display based on a projector, and a third display based on an organic light-emitting diode.

6. The vehicle of claim 1, further comprising, one or more sensor configured to output one or more digital representation, wherein
the one or more display comprises a first display and a second display, the first display is configured to provide a first portion of the visual output, and the second display is configured to provide a second portion of the visual output,
the plurality of regions comprises a first region and a second region, and the first display is configured to provide the first portion of the visual output within the first region, and the second display is configured to provide the second portion of the visual output within the second region,
wherein the visual output comprises a first user interface element within the first portion of the visual output and a second user interface element within the second portion of the visual output,
the non-transitory memory further comprises a neural network and instructions operable upon execution by the one or more processors to:
recognize one or more gesture, wherein the recognition of the one or more gesture is based on the one or more digital representation and the neural network,
determine an operation, wherein the determination of the operation is based on the one or more gesture and the neural network,
determine a selection, wherein the determination of the selection is indicative of the first user interface element or the second user interface element, the determination of the selection is based on the one or more gesture, and the one or more neural network, and
execute the operation, wherein the execution of the operation is based on the one or more processors and the selection.

7. The vehicle of claim 6, wherein:
the one or more sensor comprises a first sensor positioned on a roof of the vehicle and a second sensor positioned on a dashboard of the vehicle,
the one or more digital representation comprises a first digital representation based on the first sensor and a second digital representation based on the second sensor, and
a first input of the neural network is based on the first digital representation and a second input of the neural network is based on the second digital representation.

8. The vehicle of claim 1, wherein the visual output is based on a digital representation and the digital representation depicts surroundings of the exterior of the vehicle.

9. The vehicle of claim 8, wherein the surroundings of the exterior of the vehicle comprise a rear view and the rear view is based on a perspective from a location on the vehicle, wherein a projector of the one or more display is arranged on a roof of the vehicle, and wherein the location is a side of the vehicle.

10. The vehicle of claim 1, wherein the one or more display comprises a first display and a second display, the first display is configured to provide a first portion of the visual output based on a projector, and the second display is configured to provide a second portion of the visual output based on an organic light emitting diode integrated with the pane.

11. The vehicle of claim 10, wherein the plurality of regions comprises a first region and a second region, and the first display is configured to provide the first portion of the visual output within the first region, and the second display is configured to provide the second portion of the visual output within the second region.

12. The vehicle of claim 11, wherein the first region forms a border with the second region and the first portion of the visual output on the border is less luminant than a maximum luminance of the first portion of the visual output.

13. The vehicle of claim 11, wherein the first region forms a border with the second region and the first portion of the visual output on the border is less luminant than a maximum luminance of the second portion of the visual output.

14. The vehicle of claim 11, wherein the first display comprises a wedge film and the wedge film is configured to reduce an appearance of reflections associated with the first display or the second display.

15. A method for operating a vehicle, the method comprising:
causing a visual output to adjust transmissions of visible light through a first region and a second region, wherein the first region has a size and a shape different than a size and a shape of the second region, wherein the size and the shape of the first region is complementary to the size and the shape of the second region to integrate together in a patchwork and fit together without gaps within the patchwork, wherein the first region has a symmetrical shape and the second region has an asymmetrical shape, and wherein the visual output comprises a first user interface element and a second user interface element, the first user interface element depicted within the first region and the second user interface element depicted within the second region;
recognizing gestures, wherein the recognition of the gestures is based on one or more digital representation, one or more gestures are indicative of an operation and a selection, and the selection is indicative of the first user interface element or the second user interface element; and
executing the operation, wherein the execution of the operation is based on the selection.

16. The method of claim 15, wherein the operation comprises an adjustment to an experience provided to an occupant of the vehicle.

17. A method for training a neural network, the method comprising:
curating training data, wherein the training data comprises depictions of gestures and annotations of the gestures and the gestures are based on depictions of a position of a first body part and depictions of a movement of a second body part;
training the neural network based on a first subset of the training data, wherein the neural network is configured to recognize the operation and the selection of the first user interface element or the selection of the second user interface element;
validating the neural network based on a second subset of the training data; and
using the trained and validated neural network to recognize the gestures of claim 15.

18. The method of claim 17, wherein the first body part comprises one or more of an eye, a head, or a neck, and the second body part comprises a hand.

\* \* \* \* \*